United States Patent
Kajiyama

(10) Patent No.: US 8,823,349 B2
(45) Date of Patent: Sep. 2, 2014

(54) SWITCHING REGULATION CONTROLLER, SWITCHING REGULATOR AND CONTROLLING METHOD FOR SWITCHING REGULATION

(75) Inventor: Shinya Kajiyama, Kodaira (JP)

(73) Assignee: Renesas Electronics Corporation, Kawasaki-Shi (JP)

( * ) Notice: Subject to any disclaimer, the term of this patent is extended or adjusted under 35 U.S.C. 154(b) by 696 days.

(21) Appl. No.: 13/095,711

(22) Filed: Apr. 27, 2011

(65) Prior Publication Data

US 2011/0267016 A1    Nov. 3, 2011

(30) Foreign Application Priority Data

Apr. 28, 2010  (JP) ................................. 2010-102979

(51) Int. Cl.
 *G05F 1/00* (2006.01)
(52) U.S. Cl.
 USPC ........................................................ 323/283
(58) Field of Classification Search
 USPC .................................... 323/283; 700/297, 298
 See application file for complete search history.

(56) References Cited

U.S. PATENT DOCUMENTS

| 6,992,469 | B1 * | 1/2006 | King | 323/283 |
| 7,602,166 | B1 * | 10/2009 | Kang | 323/283 |
| 7,928,715 | B2 * | 4/2011 | Shibata | 323/284 |
| 2004/0245974 | A1 * | 12/2004 | Kitani et al. | 323/284 |
| 2008/0247734 | A1 | 10/2008 | Sugie | |
| 2008/0290851 | A1 * | 11/2008 | Akashi et al. | 323/283 |

FOREIGN PATENT DOCUMENTS

JP  2008-79483 A  4/2008

OTHER PUBLICATIONS

Xinquan et al. "A Novel Digital Soft-Start Circuit for DC-DC Switching Regulator", International Conference on ASIC, pp. 564-567, 2005.

* cited by examiner

*Primary Examiner* — Jue Zhang
(74) *Attorney, Agent, or Firm* — Miles & Stockbridge P.C.

(57) ABSTRACT

A switching regulation controller for driving a switch circuit included in a switching regulator which converts an input voltage to a target voltage, and outputs the target voltage. The switching regulation controller detects an error between the output voltage and the target voltage, and uses the detected error and a control amount generated previously to control the switch circuit so that the output voltage is coincident with the target voltage according to a transfer function.

8 Claims, 5 Drawing Sheets

SWITCHING REGULATION CONTROLLER, SWITCHING REGULATOR AND CONTROLLING METHOD FOR SWITCHING REGULATION

CROSS-REFERENCE TO RELATED APPLICATIONS

The Present application claims priority from Japanese application JP 2010-102979 filed on Apr. 28, 2010, the content of which is hereby incorporated by reference into this application.

BACKGROUND

The present invention relates to a technique involved with a switching regulator operable to supply electric power, and particularly to a technique useful in application to a switching regulator controlled based on digital signal processing.

A power-supply circuit typified by a DC-DC converter need to be kept from supplying an output voltage thereby to reduce the power consumption when the power supply is not required. However, a power-supply circuit needs to rapidly raise and stabilize, at a predetermined level, its output voltage when they are required to supply electric power. Overshoot of the output voltage developed at the time of raising the output voltage would cause an excess voltage to be applied to a load device or a large amount of inrush current to pass therethrough when connecting the load device to an output terminal of the power-supply circuit, thereby breaking down the load device. On this account, it is necessary to rapidly raise an output voltage while avoiding its overshooting at the time of starting power supply.

In recent years, the system of controlling a negative feedback of a power-supply circuit has been in the process of change from analog to digital. For example, in an analog system, the difference between a set voltage and an output voltage is amplified and integrated, and the resultant signal is compared with a sawtooth signal by a comparator, whereby PWM (Pulse Width Modulation) signal is generated. Subsequently, the PWM signal thus generated is used to control ON/OFF of a power MOSFET of a switch circuit. The output voltage is varied by changing the ratio of ON time during which the power MOSFET stays in ON state to OFF time during which the power MOSFET is in OFF state, namely duty ratio, whereby the negative feedback is controlled so that the output voltage is coincident with the set voltage.

In contrast, in a digital system, operations e.g. amplification and integration are replaced with digital signal processing by DSP (Digital Signal Processor). Specifically, ADC (Analog to Digital Converter) converts an output voltage into a digital signal, and DSP processes the digital signal. Then, a digital PWM circuit, which generates a pulse having a width depending on the result of the signal processing, controls the duty ratio of the power MOSFET (Metal Oxide Semiconductor Field Effect Transistor), whereby the negative feedback is controlled so that the output voltage is coincident with the set voltage. According to such digital system, a control parameter can be adjusted by a software program, and therefore a power-supply circuit can be flexibly designed according to its application and function. Further, a digital system can suppress the effects of manufacturing variations and environmental variations on the control characteristics in comparison to an analog system.

However, the stability margin of a negative feedback loop of a power-supply circuit according to a digital system is in danger of being deteriorated in comparison to that of an analog-based power-supply circuit. This is because a delay time which need not to be taken into account in the case of an analog system, e.g. time for conversion by ADC, and time for calculation by DSP, is figured in as factors of delay in a negative feedback loop in the case of a digital system. In other words, the deterioration of the stability margin of a negative feedback loop in a digital power-supply circuit can increase an overshoot and a ringing at the time of raising the output voltage, and in the worst case, it would cause the oscillation. Therefore, with a power-supply circuit for which the digital system is adopted, it is required to reduce an overshoot at the time of raising the output voltage even after the stability margin is deteriorated.

Conventional techniques for reducing an overshoot at the time of raising the output voltage include a technique referred to as "soft start", by which the output voltage is raised forcibly and slowly. According to the "soft start" in the case of the analog system, the reduction in overshoot is generally achieved by raising the set voltage in a slope-like curve, e.g. charging an electric current into a capacitor thereby to produce a set voltage which varies in a slope-like curve. The non-patent document presented by L. Xinquan, G. Jianping, Y. Weixue, and C. Yu, "A novel digital soft-start circuit for DC-DC switching regulator", International Conference on ASIC, pp. 564-567, 2005, discloses a technique for realizing the "soft start" by using a logic circuit and DAC (Digital to Analog Converter) to raise the output voltage stepwise, which eliminates the need for the capacitor.

Further, the Japanese Unexamined Patent Publication No. JP-A-2008-79483 discloses a technique for suppressing an overshoot of RPM (Revolutions Per Minute) of a motor. A motor driving circuit disclosed by JP-A-2008-79483 calculates a control amount depending on a digital value representing a quantity of error, which is the difference between the current RPM and target RPM, and controls the motor RPM to be the target value based on the calculated control amount, according to digital negative feedback control. The motor driving circuit sets the upper limit of the digital value at the time of calculating the control amount. As a result of so setting, the digital value never exceeds the upper limit no matter how large the value of the error is. Therefore the control amount is controlled appropriately, and thus the overshoot of the motor RPM can be suppressed.

SUMMARY

The technique described in the non-patent document presented by L. Xinquan, et al. results in the increase in the rising time of the output voltage because the reduction of overshoot is achieved by raising the output forcibly and slowly. Further, according to the technique disclosed by JP-A-2008-79483, the control amount is calculated not based on a digital value depending on a quantity of error usually used, but using the upper limit digital value, and therefore the change in the process of making the motor RPM closer to the target motor RPM is more fluent. In short, both the techniques disclosed by the non-patent document presented by L. Xinquan, et al. and the patent document JP-A-2008-79483 must sacrifice the rapid response for the reduction in overshoot.

Therefore, it is an object of the invention to reduce an overshoot at the time of rising an output voltage of a switching regulator without sacrificing the rising time of the output voltage.

The above and other objects of the invention, and novel features thereof will be apparent from the description hereof and the accompanying drawings.

Of the preferred embodiments of the invention herein disclosed, a representative one will be outlined below.

A switching regulation controller according to the embodiment is one for driving a switch circuit included in a switching regulator which converts an input voltage to a target voltage, and outputs the converted voltage, which detects an error between the output voltage and the target voltage, and which uses the detected error and the control amount generated before to generate the control amount for controlling the switch circuit so that the output voltage is coincident with the target voltage according to a given transfer function. When the detected error becomes smaller than the given value, the switching regulation controller uses, instead of the control amount generated before, a candidate value smaller than the control amount to generate the control amount.

The effects achieved by the representative embodiment of the invention are as follows in brief.

The overshoot at the rise of the output voltage can be reduced without sacrificing the rising time of the output voltage of the switching regulator.

DETAILED DESCRIPTION

1. Summary of the Embodiments

Figure 1:
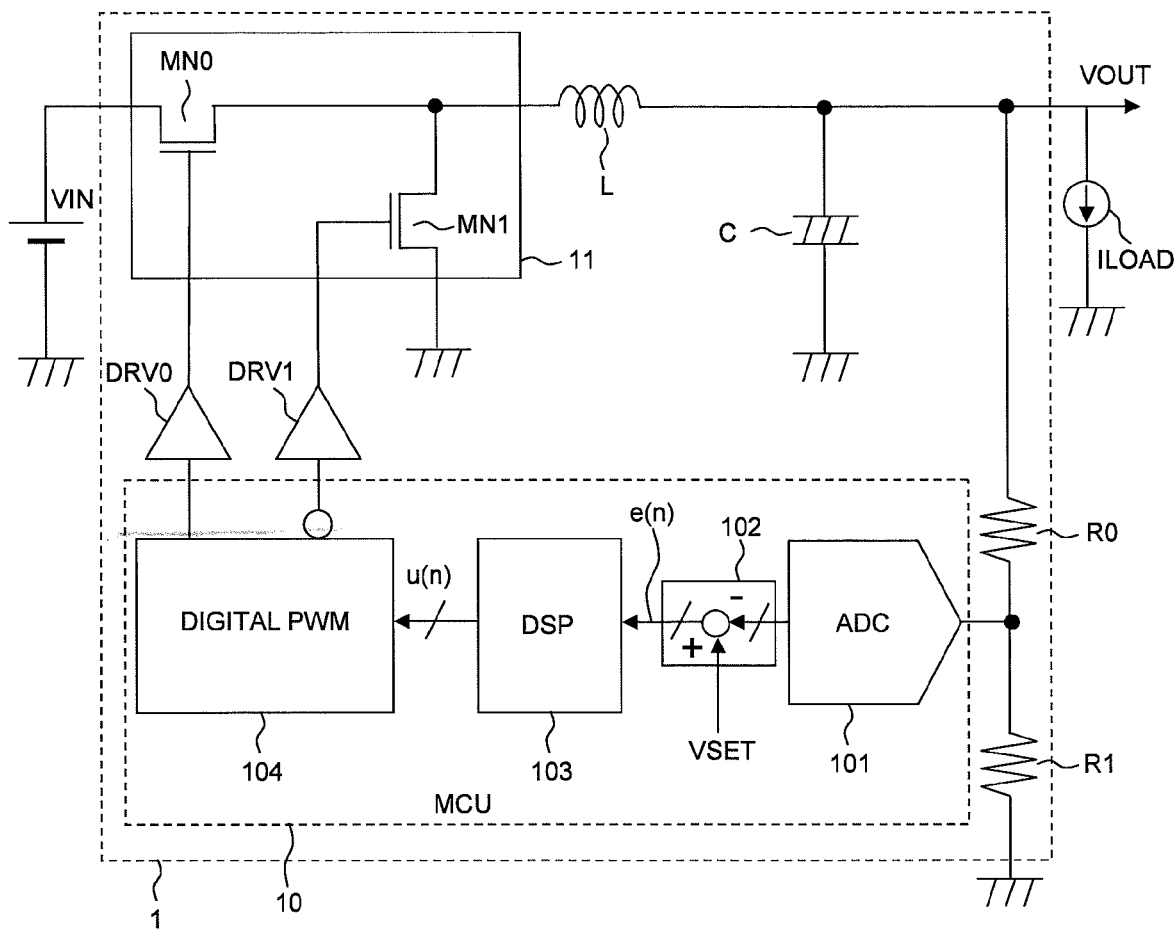
FIG. 1 is a block diagram showing, as an example, a non-insulated type step-down DC-DC converter which is digitally controlled in negative feedback, and in which a switching regulation controller according to the first embodiment of the invention is used.

The preferred embodiments of the invention herein disclosed will be outlined first. Here, the reference numerals or signs for reference to the drawings, which are accompanied with paired round brackets, only exemplify what the concepts of members or components referred to by the numerals or signs contain.

[1] (Digital Switching Regulation Controller Operable to Overwrite a Digital Filter Parameter)

A switching regulation controller (10, 12) according to a preferred embodiment of the invention is for driving a switch circuit (11) included in a switching regulator (1, 2) which converts a voltage (VIN) input thereto into a target voltage (VSET), and outputs the target voltage, and has an error detection unit (102, 102) which samples the output voltage (VOUT), and generates and outputs error data (e(n)) showing an error between the sampled output voltage and the target voltage. Also, the switching regulation controller has a control-amount-generating unit (103, 20) which generates a control amount (u(n)) for controlling the switch circuit so that the output voltage is coincident with the target voltage according to a given transfer function, provided that the control amount is generated using the error data, error data generated before, and a control amount (u(n−1), u(n−2)) generated before. Further, the switching regulation controller has a driving-signal-generating unit (104) which generates a signal having a pulse width depending on the control amount, and outputs the generated signal as a driving signal for driving the switch circuit. On condition that an error value shown by the error data is smaller than a given value, the control-amount-generating unit performs one of the steps of: generating the control amount using a candidate value smaller than the control amount instead of the control amount generated before; and generating the control amount using a candidate value smaller than the error data instead of the error data corresponding to the control amount generated before.

According to this arrangement, the control-amount-generating unit performs a usual calculating process to calculate a control amount according to the error value and the control amount calculated before until the error between the output voltage and the target voltage reaches a given value, and therefore a rapid rise of the output voltage can be achieved. Then, when the error between the output voltage and the target voltage reaches the given value, the control-amount-generating unit uses, instead of a large control amount of the past calculated to make the output voltage closer to the target voltage rapidly, a candidate value smaller than the large control amount of the past to calculate a new control amount. Alternatively, the control-amount-generating unit uses a value smaller than a large error value of the past to calculate a new control amount. Consequently, the occurrence of overshoot attributed to an excessively large control amount calculated in the past can be suppressed.

[2] (One-Off Rewrite of Parameters)

As to the switching regulation controller as described in [1], the control-amount-generating unit performs the step of generating the control amount using the candidate value only once.

According to this arrangement, the control-amount-generating unit generates a control amount using the candidate value only once when the error value becomes smaller than a given value, and thereafter goes back to a normal control condition, in which the control amount is generated according to a control amount calculated before. As a result, it is possible to prevent harmful effects of not performing the usual control, e.g. the tendency of the output voltage to become unstable, and the difficulty in stabilizing the output voltage at a target voltage in a situation in which the output voltage is near the target voltage. In addition, the same effect and advantage as those achieved by the switching regulation controller as described in [1] are brought about.

[3] (Configuration of the Digital Filter with Dedicated Hardware)

As to the switching regulation controller as described in [1] or [2], the control-amount-generating unit (20) has a first storing unit (210) which stores a given threshold value, and a comparing unit (211) which compares a value of the first storing unit with a value of error involved in the error data, and outputs a result of the comparison. The control-amount-generating unit also has: a calculating unit (22) which uses the error data and the control amount generated before to calculate a new control amount according to the given transfer function; and a second storing unit (221, 222) which stores one of a candidate value smaller than the control amount and a candidate value smaller than the error data. On condition that the comparison result output by the comparing unit shows a value of error involved in the error data is smaller than the threshold, the calculating unit performs one of the steps of: executing the calculation using, instead of the control amount generated before, the candidate value smaller than the control amount, which is put in the second storing unit; and executing the calculation using, instead of the error data corresponding to the control amount generated before, the candidate value smaller than the error data, which is put in the second storing unit.

According to this arrangement, power consumption can be suppressed in comparison to the case of the control-amount-generating unit constituted by DSP. In addition, the switching regulation controller as described in [1] or [2] can be materialized readily.

[4] (Externally-rewritable Registers)

As to the switching regulation controller as described in [3], the first and second storing units are both externally rewritable.

According to this arrangement, the threshold of the error value and the candidate value can be adjusted, and therefore the extent to which the overshoot of the output voltage is suppressed can be regulated according to requirements of the specification of the switching regulator, and other conditions.

[5] (Configuration of the Digital Filter by a Software Program)

As to the switching regulation controller as described in [1] or [2], the control-amount-generating unit is composed of a processor (103) for digital signal processing.

According to this arrangement, if DSP is used to constitute the control-amount-generating unit, for example, it becomes possible to cope with the change of the specification of the switching regulator and the like by means of a software program. Therefore, a more flexible design can be realized for a switching regulator in comparison to the control-amount-generating unit constituted by dedicated hardware.

[6] (Semiconductor Device Formed into One Chip)

The switching regulation controller as described in any one of [1] to [5] is formed on a semiconductor substrate.

[7] (Switching Regulator)

A switching regulator (1, 2) according to a preferred embodiment of the invention is one which converts an input voltage (VIN) to a target voltage and outputs the target voltage, and which has: a switch circuit (11) in charge of the conversion, and an error detection unit (101, 102) which samples the output voltage (VOUT), and generates and outputs error data showing an error between the sampled output voltage and the target voltage. Also, the switching regulator has a control-amount-generating unit (103, 20) which uses the error data, error data generated before, and a control amount generated before to generate a control amount for controlling the switch circuit so that the output voltage is coincident with the target voltage according to a given transfer function. Further, the switching regulator has a driving-signal-generating unit (104) which generates a signal having a pulse width depending on the control amount, and outputs the generated signal as a driving signal for driving the switch circuit. In the switching regulator, on condition that an error value shown by the error data is smaller than a given value, the control-amount-generating unit conducts one of the steps of: generating the control amount using a candidate value smaller than the control amount instead of the control amount generated before; and generating the control amount using a candidate value smaller than the error data instead of the error data corresponding to the control amount generated before.

According to this arrangement, the switching regulator brings about the same effect and advantage as those achieved by the switching regulation controller as described in [1].

[8] (Controlling Method for Switching Regulation)

A controlling method for switching regulation according to a preferred embodiment of the invention is for controlling a switch circuit (11) included in a switching regulator (1) thereby to output a target voltage, and which includes a first step (S101) of sampling the output voltage, and then detecting an error between the sampled output voltage and the target voltage. Also, the controlling method for switching regulation includes a second step (S102, S103) of detecting a given condition in which the error becomes smaller than a given threshold. Further, the controlling method for switching regulation includes a third step (S106) of using a control amount generated before and a value of the error to generate a control amount for controlling the switch circuit so that the output voltage is coincident with the target voltage, according to a given transfer function on condition that the given condition is not detected. Moreover, the controlling method for switching regulation includes: a fourth step (S104, S106) of using a candidate value smaller than the control amount generated before and the error value to generate the control amount according to the given transfer function on detection of the given condition; and a fifth step of generating a signal having a pulse width depending on the generated control amount, and driving the switch circuit.

According to this arrangement, the switching regulator can reduce the overshoot in the same way as the switching regulator as described in [1] does.

[9] (One-off Control Using Control Amount after Change)

As to the controlling method for switching regulation as described in [8], the given condition is a condition where the error first becomes smaller than the given threshold (S105).

According to this arrangement, the switching regulator can reduce the overshoot without marring the stability of the output voltage even in a situation where the output voltage is near the target voltage, which is the same as the effect of the switching regulation controller as described in [2].

2. Further Detailed Description of the Embodiments

The embodiments will be described further in detail.

<<First Embodiment>>

FIG. 1 shows a non-insulated type step-down DC-DC converter which is digitally controlled in negative feedback, and in which a switching regulation controller according to a specific embodiment of the invention is used. The DC-DC converter is e.g. a switching regulator operable to supply a power source to CPU, a memory and other parts for a server.

The DC-DC converter 1 shown in FIG. 1 has: a switch circuit 11 including power MOS transistors MN0 and NM1; driver circuits DRV0 and DRV1 for driving the power MOS transistors; a smoothing circuit including a coil L and a capacitor C; detection resistances R0 and R1 for detecting an output voltage VOUT; and a switching regulation controller 10.

In the DC-DC converter 1, the power MOS transistor MN0 serves as a high-side switch, and the power MOS transistor MN1 serves as a low-side switch. The power MOS transistors MN0 and MN1 are driven by the driver circuits DRV0 and DRV1 so that the high- and low-side switches are turned ON/OFF alternately. Thus, a voltage resulting from the conversion of a voltage VIN input to the switch circuit 11 is rectified into a direct current by the smoothing circuit, and then output as the output voltage VOUT. At the time of the output, the output voltage VOUT is controlled to be equal to a target voltage by the switching regulation controller 10.

Although no special restriction is intended, the switching regulation controller 10 is formed on a semiconductor substrate, such as a bulk of single crystal silicon, by the known CMOS IC manufacturing technology. The switching regulation controller is e.g. IC for exclusively use on a power-supply controller, or a general-purpose MCU (Micro Control Unit). The switching regulation controller 10 has: an analog-to-digital converter (ADC) 101; an error-data-generation circuit 102; DSP 103; and a digital PWM circuit 104.

The switching regulation controller 10 performs the following procedure in controlling the output voltage VOUT. First, the voltage resulting from the division by the detection resistances R0 and R1 is input to the ADC 101. The ADC 101 converts the input voltage to a digital value, and provides it to the error-data-generation circuit 102. The error-data-generation circuit 102 calculates a difference between a set voltage value VSET showing the target voltage based on the input digital value and the output voltage VOUT, and provides the result of the calculation to DSP 103 as error data e(n). The DSP 103 is a program processing device specialized in digital signal processing. The DSP 103 uses the value of the received error data e(n) to perform the operation of differentiation and integration (sum-of-product arithmetic operation) to calculate a control amount u(n) for driving the switch circuit 11, and provides the control amount u(n) to the digital PWM circuit 104. The digital PWM circuit 104 is a digital pulse-width-modulation circuit, which generates driving signals having a pulse width (duty ratio) depending on the control amount u(n), and outputs the driving signals to driver circuits at intervals of a fixed length of time. Then, the driver circuits DRV0 and DRV1 drive the switch circuit 11 in response to the driving signals, whereby the output voltage is controlled to be equal to a target voltage.

The DSP 103 performs the operation of differentiation and integration according to a predetermined transfer function thereby to compensate for digital negative feedback control. To achieve a necessary frequency property by the differentiation and integration, a value of the past must be used. Hence, DSP 103 constitutes a digital filter, and realizes compensation for digital negative feedback control.

In the description on the first embodiment, the example of using an IIR (Infinite Impulse Response) digital filter to realize a feedback control according to PID (Proportional Integral Derivative) control is taken. Incidentally, an IIR digital filter is a filter which computes a current output value by use of the sum of values calculated by multiplying, by given coefficients, a current input value, an input value at the sampling time n times before (n: a natural number) and an output value at the sampling time n times before.

Figure 2:
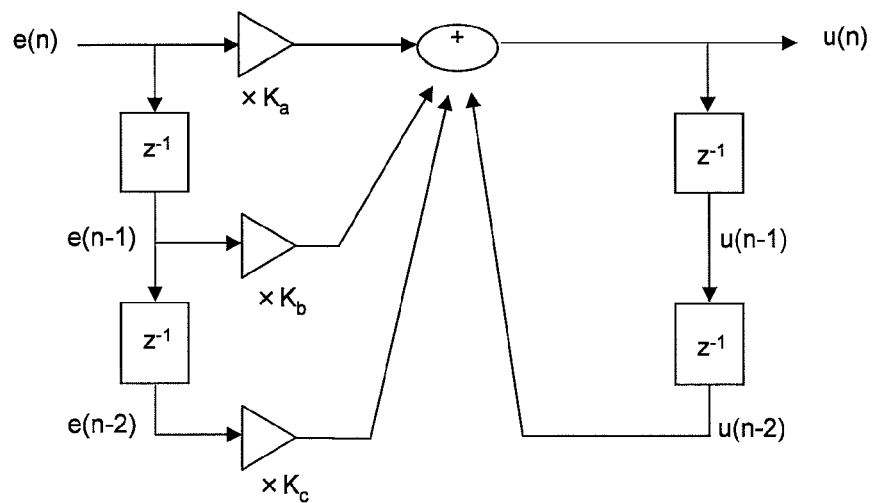
FIG. 2 is a diagram for explaining an example of the transfer function involved in PID control by a second-order IIR digital filter.

Referring to FIG. 2, an example of the transfer function involved in feedback control according to PID control by the second-order IIR digital filter in DSP 103 will be described.

The PID control transfer function shown by FIG. 2 is drawn as follows.

If an input is represented by e, and an output is represented by u, the PID control transfer function is given by:

$$\frac{u}{e} = K_p + \frac{K_i}{s} + K_d s \quad \text{(Expression 1)}$$

The Expression s=2 (z−1)/Ts(z+1) is drawn by expanding z=exp(sTs) and dropping the second and subsequent terms. If the bilinear transform is conducted on s=2 (z−1)/Ts (z+1), the following function is obtained:

$$u(n)=u(n-2)+K_a e(n)+K_b e(n-1)+K_c e(n-2) \quad \text{(Expression 2)}.$$

The function u(n) given by Expression 2 corresponds to the transfer function shown by FIG. 2, where u(n) represents a current output of the digital filter, namely a control amount corresponding to PWM duty ratio, u(n−1) represents a control amount calculated at the immediately preceding sampling time, and u(n−2) represents a control amount calculated at the time of sampling two times before. Further, e(n) is the error data e(n) in the current switching cycle, which is a value expressed by: Set Voltage VSET−Output Voltage VOUT. e(n−1) is the error data e(n) at the immediately preceding sampling time, and e(n−2) is the error data e(n) at the time of sampling two times before. Ts represents a sampling cycle, and Ka, Kb, Kc, Kp, Ki and Kd are coefficients of the digital filter. The relations among the coefficients are given by:

$$K_a = K_p + K_i \frac{T_s}{2} + K_d \frac{2}{T_s}, \quad \text{(Expression 3)}$$

$$K_b = K_i T_s - K_d \frac{4}{T_s}, \quad \text{(Expression 4)}$$

and $$K_c = -K_p + K_i \frac{T_s}{2} + K_d \frac{2}{T_s}. \quad \text{(Expression 5)}$$

As clear from Expression 2 and FIG. 2, the control amount u(n) of the current switching cycle, namely PWM duty ratio can be determined by adding up Kaxe(n), Kbxe(n−1), Kcxe (n−2) and u(n−2). That is, in addition to the current error data, the error data e(n) of the past, and the control amount calculated in the past are used as parameters to calculate a control amount. In this way, even when the output voltage VOUT is raised to the set voltage VSET, for example, the error data up to the time of sampling two times before, which were created before the output voltage VOUT reaches the set voltage VSET, and a control amount calculated at the time of sampling two times before, are left as parameters of the transfer function. Particularly, before the output voltage VOUT reaches the set voltage VSET, the control amount is calculated so as to output a PWM duty ratio close to 100% for the purpose of rapidly raising the output voltage, and therefore a large value is left as the control amount u(n−2). Therefore, in regard to a system insufficient in stability margin due to the time delay in negative feedback loop, there is a high possibility that an overshoot is caused if the subsequent PWM duty ratio is calculated using the control amount u(n−2), which has a large value when the output voltage VOUT reaches the set voltage VSET. Hence, to calculate the control amount u(n) using smaller values of u(n−2) and u(n−1), the switching regulation controller 10 according to the first embodiment is arranged so that the control amounts u(n−2) and u(n−1) are once reset before the output voltage VOUT reaches the set voltage VSET.

Figure 3:
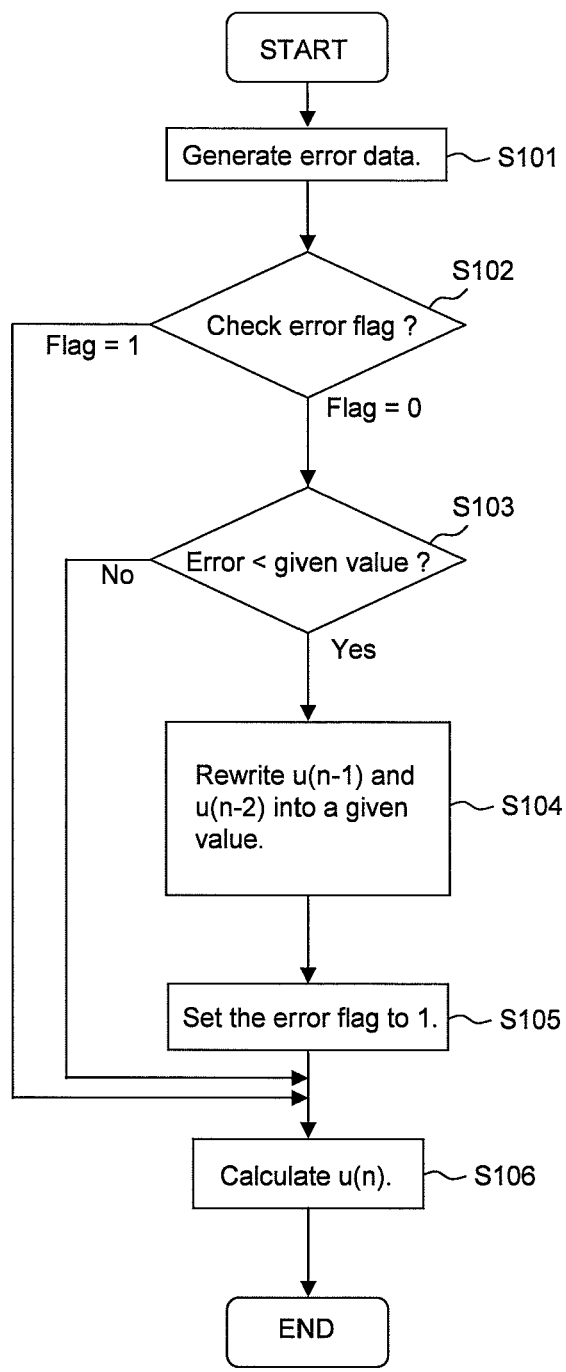
FIG. 3 is a flow chart for a method for calculating the control amount u(n) in DSP 103.

FIG. 3 presents a flow chart concerning a method for calculating the control amount u(n) in DSP 103.

Referring to FIG. 3, an example of the method for rewriting values of control amounts u(n−2) and u(n−1) involved in the digital filter into a given value, which have been set in advance, when the value of error data e(n) comes to a given threshold or below will be described. In this example, the set voltage VSET is 3.3 volts, and the threshold value is 0.3 volts.

As shown in FIG. 3, after the switching cycle is started, a value of the output voltage VOUT is first sampled, and error data e(n) is generated by the error-data-generation circuit 102, and is input to DSP 103 (S101). On receipt of the error data e(n), DSP 103 judges whether or not an error flag is valid, namely "1" (S102). The error flag is for indicating that the value of error data showing a value of error has become smaller than the threshold. The error flag is made valid, namely "1", when the value of error first comes to a value smaller than the threshold. For instance, when in response to the startup of the switching regulator, the output voltage rises from zero volt and the value of error first exceeds the threshold, i.e. when the output voltage first exceeds a voltage of 3.0 volts, DSP 103 sets the error flag to "1". The error flag is initialized to "0" e.g. at power-on reset, or at the start of the action of raising the output voltage of the switching regulation controller 10. The error flag may be reset after a length of time enough to stabilize the output voltage VOUT at a target voltage has elapsed.

If the error flag is "1" in Step S102, then DSP 103 uses the control amount u(n−2) to calculate a control amount u(n) according to the transfer function as given by Expression 2, and provides the resultant control amount u(n) to the digital PWM circuit 104 (S106).

If the error flag is "0" in Step S102, then DSP 103 judges whether or not the value of error data is smaller than the threshold (S103). If it is judged in Step S103 that the value of error data is above the threshold, namely the output voltage VOUT has not reached 3.0 volts, DSP 103 goes to Step S106, and calculates the control amount u(n) using the control amount u(n−2). On the other hand, if it is judged that the value of error data is below the threshold, namely the output voltage VOUT has already reached 3.0 volts, values of control amounts u(n−1) and u(n−2) are rewritten into a given value (S104). For instance, DSP 103 rewrites values of a register or the like, which values of the control amounts u(n−1) and u(n−2) are stored in, into a given value. The given value may be any value as long as it can suppress the overshoot of the output voltage VOUT, which is not particularly limited. For instance, a value smaller than values of the control amounts u(n−1) and u(n−2) calculated in the first switching cycle after the output voltage VOUT has reached close to 3.0 volts may be set as the given value. As to the given value, a value which enables the suppression of overshoot is previously determined based on the result of simulation or sample evaluation performed in advance, and the value is stored as the given value in a storing region of a register, a memory or the like, which is not shown in the drawing, in the switching regulation controller. In this embodiment, e.g. a value of "0" is set for the given value.

The DSP 103 sets the error flag to a value of "1" in parallel with the rewrite of the control amounts u(n−1) and u(n−2) (S105). Then, DSP 103 uses the parameter which has been rewritten in Step S104 to calculate the control amount u(n) according to Expression 2 derived from the transfer function, and provides the control amount u(n) to the digital PWM circuit 104 (S106). After that, DSP 103 goes into the subsequent switching cycle, and repeats Step S101 and the steps subsequent thereto. However, in this case, the error flag remains "1" in Step S102 in the subsequent switching cycle, and therefore DSP 103 proceeds to Step S106 without going through Step S103, and then executes a usual calculating process. In other words, after the error flag has been made valid once, DSP 103 never rewrites the control amounts u(n−1) and u(n−2).

By arranging an error flag as described above, as long as the control amounts u(n−1) and u(n−2) are rewritten once in a switching cycle during which a value of error has first reached below the threshold, the need for rewriting the control amounts in subsequent switching cycles can be eliminated. As a result, a series of the steps of stalling the rise in the output voltage temporarily, and thereafter stabilizing the output voltage at a set voltage according to a conventional way can be performed. If DSP 103 does not return to a usual calculating process after the value of error data has reached below the threshold, the output voltage would be made unstable, and never stabilized at the set voltage. Further, if the number of times the calculation is performed following the rewrite is increased, the time taken until the output voltage converges to the set voltage is made longer according to the increase. Therefore, in the first embodiment, the calculation in response to one rewrite conducted in a switching cycle during which a value of error has first reached below the threshold is executed, which is arranged in consideration of the stability of the output voltage and the extent to which the overshoot can be reduced.

Figure 4:
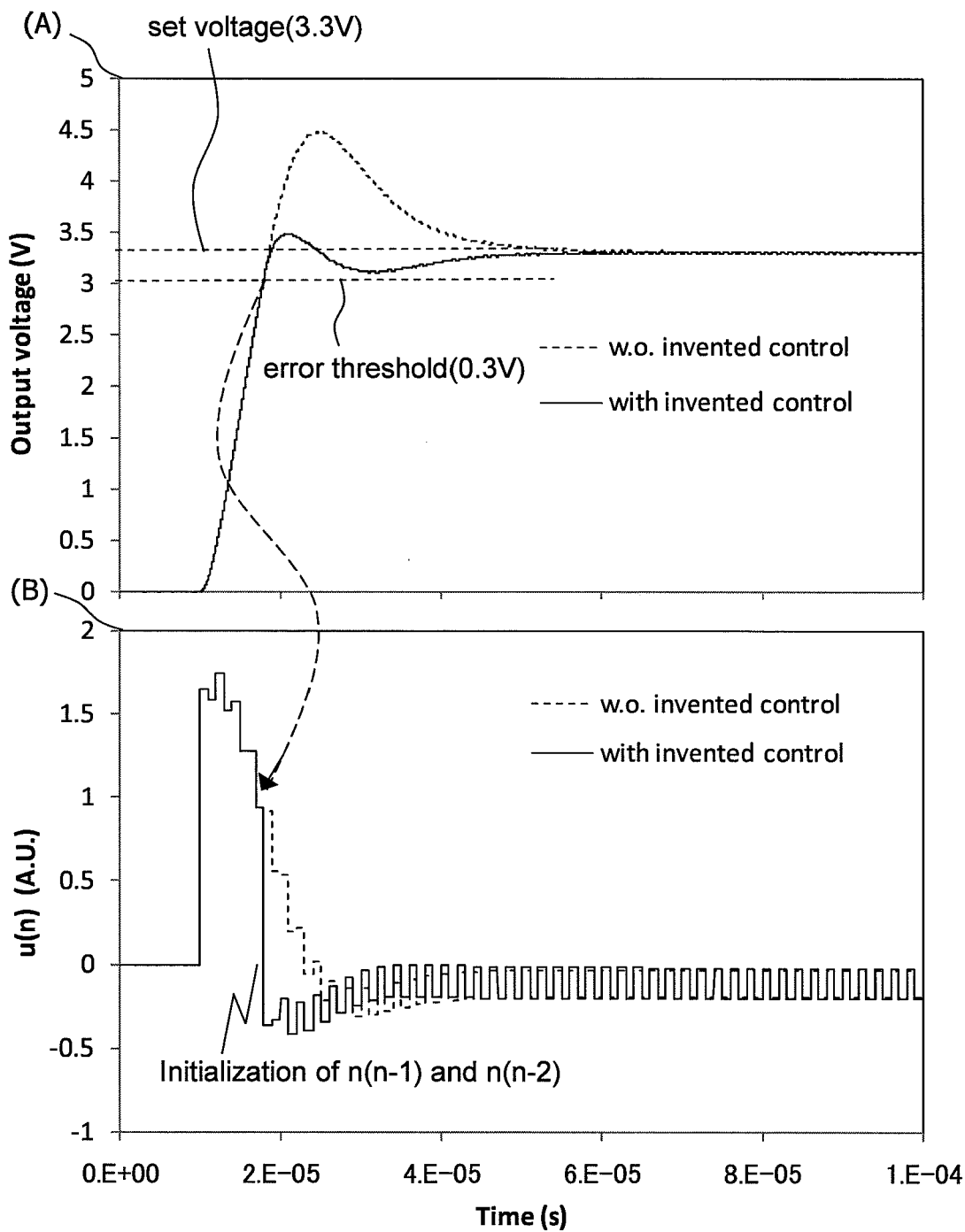
FIG. 4 is a diagram showing results of simulation of the rising characteristic of the output voltage VOUT of the DC-DC converter 1 according to the first embodiment.

FIG. 4 shows the result of simulation of the rising characteristic of the output voltage VOUT of the switching regulator 1 which incorporates the switching regulation controller 10 according to the first embodiment.

The portion (A) of FIG. 4 presents a characteristic chart showing simulated waveforms of the output voltage VOUT in raising the output voltage. The portion (B) of FIG. 4 presents a characteristic chart showing simulated waveforms of the control amount u(n) which is an output of the digital filter. The time axis of FIG. 4 is shared between the characteristic chart portions (A) and (B). In FIG. 4, a waveform drawn by a broken line shows the result of simulation of the output voltage of the DC-DC converter without the switching regulation controller 10, whereas a waveform drawn by a solid line shows the result of simulation of the output voltage of the DC-DC converter equipped with the switching regulation controller 10. Incidentally, the set voltage VSET in the simulation is 3.3 volts, and the threshold is 0.3 volts.

It is clear from the portion (A) of FIG. 4 that the use of the switching regulation controller 10 leads to the reduction in overshoot of the output voltage VOUT. Further, it can be seen from FIG. 4 that when the value of error of the output voltage reaches the threshold 0.3 volts, i.e. when the output voltage comes to 3.0 volts, DSP 103 executes the rewrite of the parameters u(n−1) and u(n−2) involved in the digital filter, whereby the value of output u(n) of the digital filter, which represents the PWM duty ratio, is made smaller. As a result, the rise of the output voltage is stalled, and the overshoot is reduced.

Using the switching regulation controller 10 according to the first embodiment as described above, the rise of the output voltage of the switching regulator is controlled without stalling in the course of raising the output voltage, whereas only immediately before the output voltage comes to the set voltage, the rise of the output voltage is stalled thereby to suppress the overshoot. Hence, according to the first embodiment of the invention, the rising time of the output voltage is never sacrificed for suppressing the overshoot unlike the prior art, and the overshoot can be reduced while keeping the rapid rise of the output voltage. For instance, on condition that the switching regulation controller according to the invention is adopted for a DC-DC converter which supplies a power source to CPU, a memory and other parts for a server placed in e.g. a data center, the power supply to the CPU, memory and other parts can be resumed rapidly when the power supply is required again even after the DC-DC converter is stopped from working as the power supply to the CPU, memory and other parts is not required. Therefore, the DC-DC converter can be deactivated frequently, which contributes to the reduction in power consumption in e.g. a data center.

In addition, the switching regulation controller 10, according to the first embodiment of the invention, rewrites the parameters of the transfer function of the digital filter having a large effect on the occurrence of overshoot, and therefore the overshoot can be reduced efficiently.

Further, in regard to the switching regulation controller 10 according to the first embodiment, the transfer function of the digital filter is single consistently, and dynamically rewriting the parameters involved in the digital filter is all that is needed to realize a desired control, and therefore, it is sufficient to analyze the characteristics of a single negative feedback loop. In this regard, the switching regulation controller according to the first embodiment is easy to design. Further, the case of realizing control by which the gain of a negative feedback loop is reduced within a smaller range of the value of error, is taken here as another example of nonlinear control. In this case, according to the prior art, a transfer function for error values within the range and another transfer function for error values out of the range are required, and the design of a switching regulator becomes more complicated. However, the control according to the first embodiment is easy to design, by which a steady-state error with respect to the output voltage can be suppressed well even in comparison to other types of nonlinear control. In addition, DSP or CPU is used to realize the digital filter and therefore, the threshold of the error value, and post-rewrite parameters involved in the digital filter can be adjusted by changing a software program. For example, the following are made possible: to regulate a negative feedback control according to requirements of the specification of a DC-DC converter; and to adjust the rising characteristic of the output voltage according to the result of measurement of a product sample.

<<Second Embodiment>>

While according to the first embodiment, a digital filter is realized by DSP 103, in the second embodiment a digital filter is realized by a dedicated hard logic circuit instead of the DSP 103.

Figure 5:
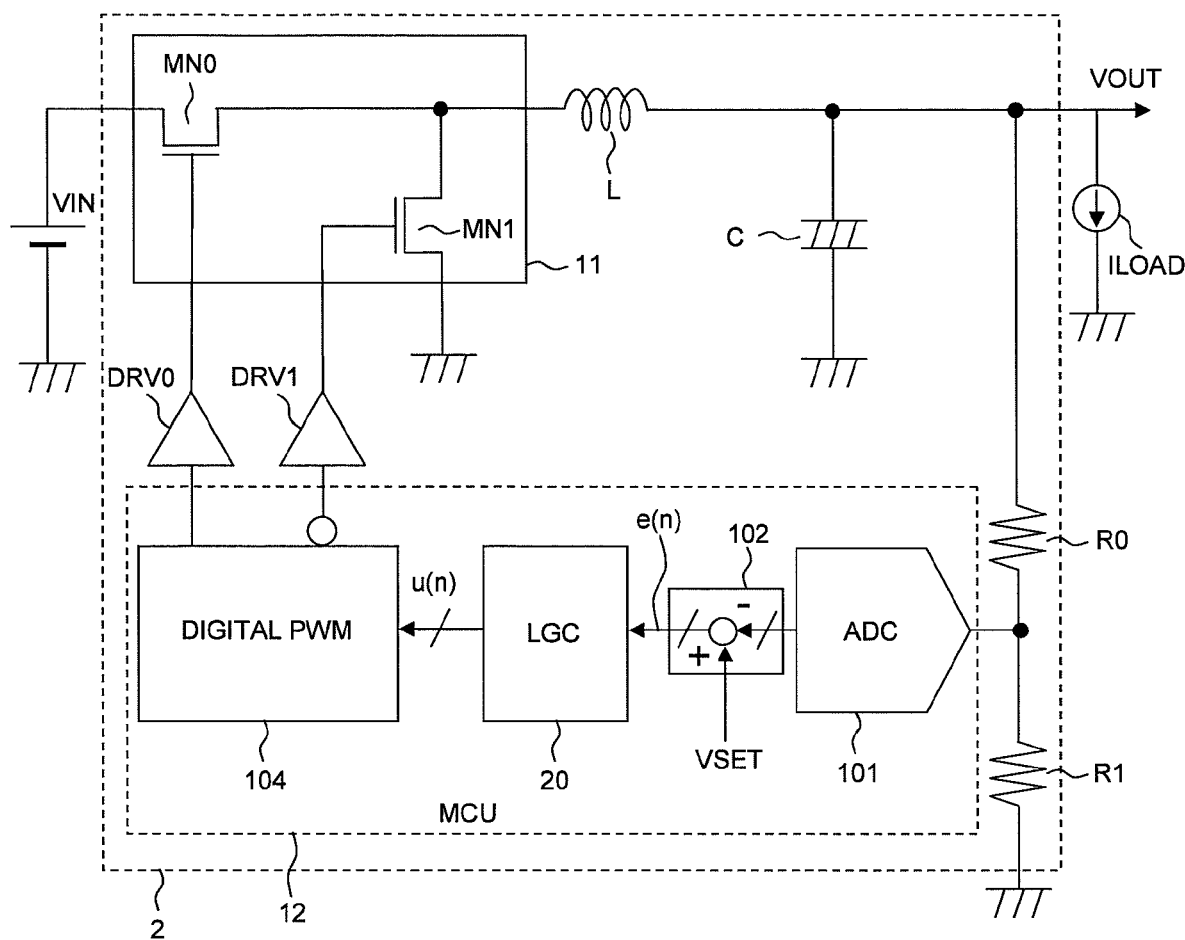
FIG. 5 is a block diagram showing, as an example, a non-insulated type step-down DC-DC converter which is digitally controlled in negative feedback, and in which a switching regulation controller according to the second embodiment of the invention is used.

FIG. 5 shows a non-insulated type step-down DC-DC converter which is digitally controlled in negative feedback, and in which a switching regulation controller according to the second embodiment of the invention is used. Now, it is noted that in FIG. 5, parts or components identical, in function, to those of the DC-DC converter 1 associated with the first embodiment are identified by the same reference numerals or characters, and the detailed descriptions thereof are omitted.

Although no special restriction is intended, the switching regulation controller 12 in the DC-DC converter 2 is formed on a semiconductor substrate, such as a bulk of single crystal silicon, by the known CMOS IC manufacturing technology. The switching regulation controller is e.g. IC for exclusively use on a power-supply controller. The switching regulation controller 12 has: an analog-to-digital converter (ADC) 101; an error-data-generation circuit 102; a digital PWM circuit 104; and a logic circuit 20.

Like DSP 103 associated with the first embodiment, the logic circuit 20 constitutes a second-order IIR filter which involves the transfer function as described with reference to FIG. 2, and performs PID control.

Figure 6:
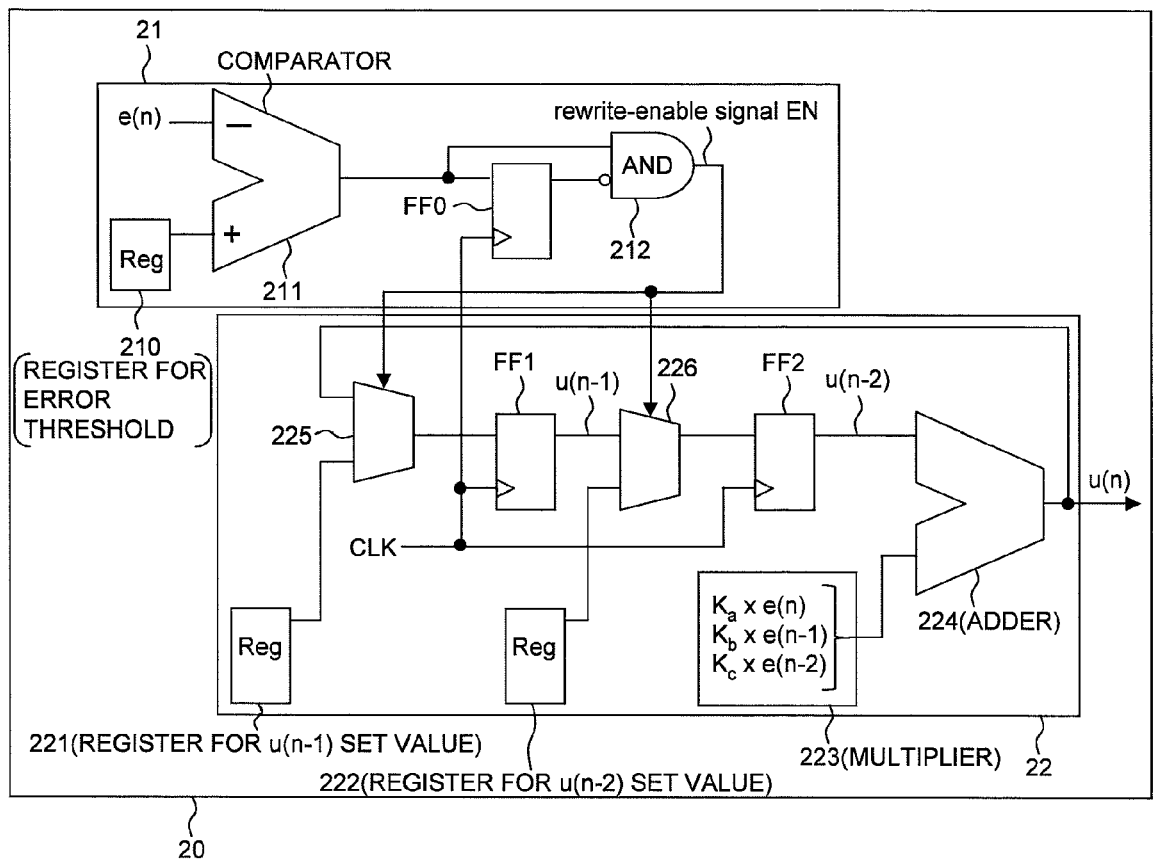
FIG. 6 is a block diagram showing an example of the logic circuit 20.

Referring to FIG. 6, the logic circuit 20 will be described here in detail.

FIG. 6 shows an example of the circuit configuration of the logic circuit 20.

The logic circuit 20 shown in FIG. 6 has: a calculating unit 22 which calculates a control amount u(n) according to a given transfer function; and a comparing unit 21 which compares a value of error data e(n) with the threshold, and directs the calculating unit 22 to rewrite parameters of the transfer function.

The comparing unit 21 has a register 210 to store the value of the threshold; a comparator 211; a flip-flop circuit FF0; and an AND circuit 212.

The register 210 can be rewritten from the outside. For instance, an external host computing machine writes the value of the threshold in the register 210 in advance through serial communication.

The comparator 211 raises its output from "0" to "1" when the value of the error data e(n) reaches below the threshold. At the time, a latch circuit provided in the comparator 211, e.g. an RS flip-flop circuit, latches the output, whereby the output signal of the comparator 211 is fixed to "1". The latched output signal is reset as required. The output signal is reset to "0" e.g. at power-on reset of the switching regulation controller 12, or at the start of the action of raising the output voltage. The output signal may be reset after a length of time enough to stabilize the output voltage VOUT at a target voltage has elapsed from the time of the change of the output of the comparator 211 to "1".

The flip-flop circuit FF0 accepts input of an output signal of the comparator 211, and outputs a signal produced by delaying the input signal by one sampling time. Then, the AND circuit 212 outputs a logical product of the inverted signal of the one-sampling-time-delayed signal and an output signal of the comparator 211, whereby a rewrite-enable signal EN for directing the rewrite of the parameters of the transfer function is output as a signal having the logical value "1" only in the switching cycle (clock cycle) during which the output of the comparator 211 has been raised from "0" to "1".

The calculating unit 22 executes the calculation according to the transfer function as described with reference to FIG. 2. The calculating unit 22 has: a multiplier 223 which multiplies error data e(n), e(n−1) and e(n−2) by given coefficients respectively, and outputs the results; an adder 224 which adds up the control amount u(n−2), the outputs of the multiplier to output the control amount u(n); selectors 225 and 226; registers 221 and 222; and flip-flop circuits FF1 and FF2.

In the registers 221 and 222 are stored parameters to use, as alternatives to the control amounts u(n−1) and u(n−2), for calculating the control amount u(n) when the value of error data reaches below the threshold. A parameter value corresponding to the control amount u(n−1) is stored in the register 221, and a parameter value corresponding to the control amount u(n−2) is stored in the register 222. Like the register 210, the registers 221 and 222 can be rewritten from the outside.

The selectors 225 and 226 selectively outputs the control amounts u(n−1) and u(n−2), and the values of the registers 221 and 222 based on the rewrite-enable signal EN provided by the comparing unit 21. For instance, if the rewrite-enable signal EN has the value "1", the selector 225 selects and outputs the value of the register 221, and the selector 226 selects and outputs the value of the register 222. Therefore, the calculating unit 22 executes a usual calculating process using the control amounts u(n−1), u(n−2) in a switching cycle during which the rewrite-enable signal is "0", whereas the calculating unit 22 executes a calculating process using the values of the registers 221 and 222 instead of the control amount u(n−1) and u(n−2) in a switching cycle during which the rewrite-enable signal is "1".

According to the second embodiment as described above, the overshoot at the time of raising the output voltage can be reduced as achieved according to the first embodiment. In addition, the threshold for the error value and post-rewrite parameters involved in the digital filter can be controlled because the registers 210, 221 and 222 are rewritable. For example, it is possible to adjust the rising characteristic of the output voltage according to requirements of the specification of a DC-DC converter, and the result of measurement of a product sample while taking into account the extent to which the overshoot is reduced. Further, as a dedicated hard logic circuit is used to build the digital filter of the switching regulation controller, the power consumption can be suppressed in comparison to a case where CPU or DSP is used to form the digital filter, which contributes to the reduction in power consumption by a DC-DC converter.

While the invention made by the inventor has been concretely described focusing on the embodiments thereof, the invention is not limited to the embodiments. It is obvious that various changes and modifications thereof may be made without departing from the subject matter thereof.

For instance, the switching regulation controller 10 according to the first embodiment may be formed not in the form of a single semiconductor integrated circuit, but in a multi-chip form.

While in the description on the first and second embodiments, the example that control amounts $u(n-1)$ and $u(n-2)$—parameters of the transfer function—are rewritten and then the control amount $u(n)$ is calculated has been taken, the invention is not limited to the example. The control amount $u(n)$ may be calculated after rewrite of the error data $e(n-1)$ and $e(n-2)$ of the past into values smaller than the values of $e(n-1)$ and $e(n-2)$. For example, in the case of the switching regulation controller 10 according to the first embodiment, the error data $e(n-1)$ and $e(n-2)$ may be rewritten instead of performing rewrite of the control amounts $u(n-1)$ and $u(n-2)$ in Step S104 of the flowchart of FIG. 3. Further, in the case of the switching regulation controller 12 according to the second embodiment, for example, alternatives to the error data $e(n-1)$ and $e(n-2)$ may be stored in the registers 221 and 222, and then the multiplier 223 may execute the calculation using the values of the registers 221 and 222 instead of the error data $e(n-1)$ and $e(n-2)$ in a switching cycle during which the rewrite-enable signal EN is "1". In this case, the values of the error data $e(n-1)$ and $e(n-2)$ are rewritten into e.g. "0" respectively.

In addition, as to the first and second embodiments, instead of rewriting either a combination of the control amounts $u(n-1)$ and $u(n-2)$ or a combination of the error data $e(n-1)$ and $e(n-2)$, both the combinations of parameters may be rewritten.

While as to the switching regulation controller according to the second embodiment, the registers 210, 221 and 222 can be rewritten from the outside, the invention is not limited so. For instance, the switching regulation controller may be arranged as follows: the threshold and the parameter values of the digital filter are written, in advance, in a nonvolatile memory which can be rewritten from the outside, and the values are read out from the memory e.g. at the time of startup of the DC-DC converter, or the time of start of the action of supplying a output voltage, and set in the registers 210, 221 and 222.

What is claimed is:

1. A switching regulation controller for driving a switch circuit included in a switching regulator which converts a voltage input thereto into a target voltage, and outputs a target voltage, the switching regulation controller comprising:
    an error detection unit configured to sample an output voltage, and to generate and output error data showing an error between a sampled output voltage and the target voltage;
    a control-amount-generating unit configured to generate a control amount for controlling the switch circuit based on the error data, error data generated previously, and a control amount generated previously, such that the output voltage is controlled to be coincident with the target voltage according to a transfer function; and
    a driving-signal-generating unit configured to generate a signal having a pulse width based on the control amount, and configured to output the generated signal as a driving signal for driving the switch circuit,
    wherein, when the error data is an error value that is smaller than a given value, the control-amount-generating unit is configured to generate the control amount using a candidate value smaller than the control amount instead of the control amount generated previously, or to generate the control amount using a candidate value smaller than the error data instead of error data corresponding to the control amount generated previously,
    wherein the control-amount-generating unit comprises
        a first storing unit configured to store a threshold value;
        a comparing unit configured to compare a value stored by the first storing unit with a value of an error associated with the error data, and configured to output a result of the comparison;
        a calculating unit configured to calculate a new control amount using the error data and the control amount generated previously according to said transfer function; and
        a second storing unit configured to store one of a candidate value smaller than the control amount and a candidate value smaller than the error data, and
    wherein, when the comparison output by the comparing unit indicates a value of error associated with the error data is smaller than the threshold value, the calculating unit is configured to execute the calculation using the candidate value smaller than the control amount, which is contained in the second storing unit, instead of the control amount generated previously, or to execute the calculation using the candidate value smaller than the error data, which is stored in the second storing unit, instead of the error data corresponding to the control amount generated previously.

2. The switching regulation controller according to claim 1, wherein the control-amount-generating unit is configured to generate the control amount using the candidate value only once.

3. The switching regulation controller according to claim 1, wherein the first and second storing units are both externally rewritable.

4. The switching regulation controller according to claim 1, wherein the control-amount-generating unit comprises a digital signal processor.

5. The switching regulation controller according to claim 1, wherein the switching regulation controller is formed on a semiconductor substrate.

6. A switching regulator which conducts a conversion from an input voltage to a target voltage and outputs the target voltage, the switching regulator comprising:
    a switch circuit;
    an error detection unit configured to sample an output voltage, and configured to generate and output error data indicating an error between the sampled output voltage and the target voltage;
    a control-amount-generating unit configured to generate a control amount for controlling the switch circuit based on the error data, error data generated previously, and a control amount generated previously, such that the output voltage is controlled to be coincident with the target voltage according to a transfer function; and
    a driving-signal-generating unit configured to generate a signal having a pulse width based on the control amount, and configured to output the generated signal as a driving signal for driving the switch circuit, wherein, when the error data is an error value that is smaller than a given value, the control-amount-generating unit is configured to generate the control amount using a candidate value smaller than the control amount instead of the control amount generated previously, or to generate the control amount using a candidate value smaller than the error data instead of error data corresponding to the control amount generated previously, wherein the control-amount-generating unit comprises a first storing unit configured to store a threshold value;

a comparing unit configured to compare a value stored by the first storing unit with a value of an error associated with the error data, and configured to output a result of the comparison;

a calculating unit configured to calculate a new control amount using the error data and the control amount generated previously according to said transfer function; and a second storing unit configured to store one of a candidate value smaller than the control amount and a candidate value smaller than error data, and wherein, when the comparison result output by the comparing unit indicates a value of error associated with the error data is smaller than the threshold value, the calculating unit is configured to execute the calculation using the candidate value smaller than the control amount, which is contained in the second storing unit, instead of the control amount generated previously, or to execute the calculation using the candidate value smaller than the error data, which is stored in the second storing unit, instead of the error data corresponding to the control amount generated previously.

7. A controlling method for switching regulation for controlling a switch circuit included in a switching regulator to output a target voltage, the method comprising:

a first step of sampling an output voltage and detecting an error between the sampled output voltage and the target voltage;

a second step of detecting a condition in which the error is smaller than a threshold value;

a third step of generating a control amount for controlling the switch circuit using a control amount generated previously and a value of the error such that the output voltage is controlled to be coincident with the target voltage, according to a transfer function, when said condition is not detected;

a fourth step of generating the control amount according to the transfer function using a candidate value smaller than the control amount generated previously and said error value upon detection of the said condition; and a fifth step of generating a signal having a pulse width based on the generated control amount and which drives the switch circuit, wherein the second step further comprises comparing the threshold value with an error value associated with the error data, and outputting a result of the comparison, wherein the comparing step further comprises outputting a result of detecting said condition when the error value is smaller than the threshold value, wherein the third step further comprises calculating a new control amount using the control amount generated previously and the error value, and wherein the fourth step further comprises calculating the new control amount using the value and the error value.

8. The controlling method for switching regulation according to claim 7, wherein the condition is a condition in which the error is smaller than the threshold value.

\* \* \* \* \*